United States Patent Office 3,176,511
Patented Apr. 6, 1965

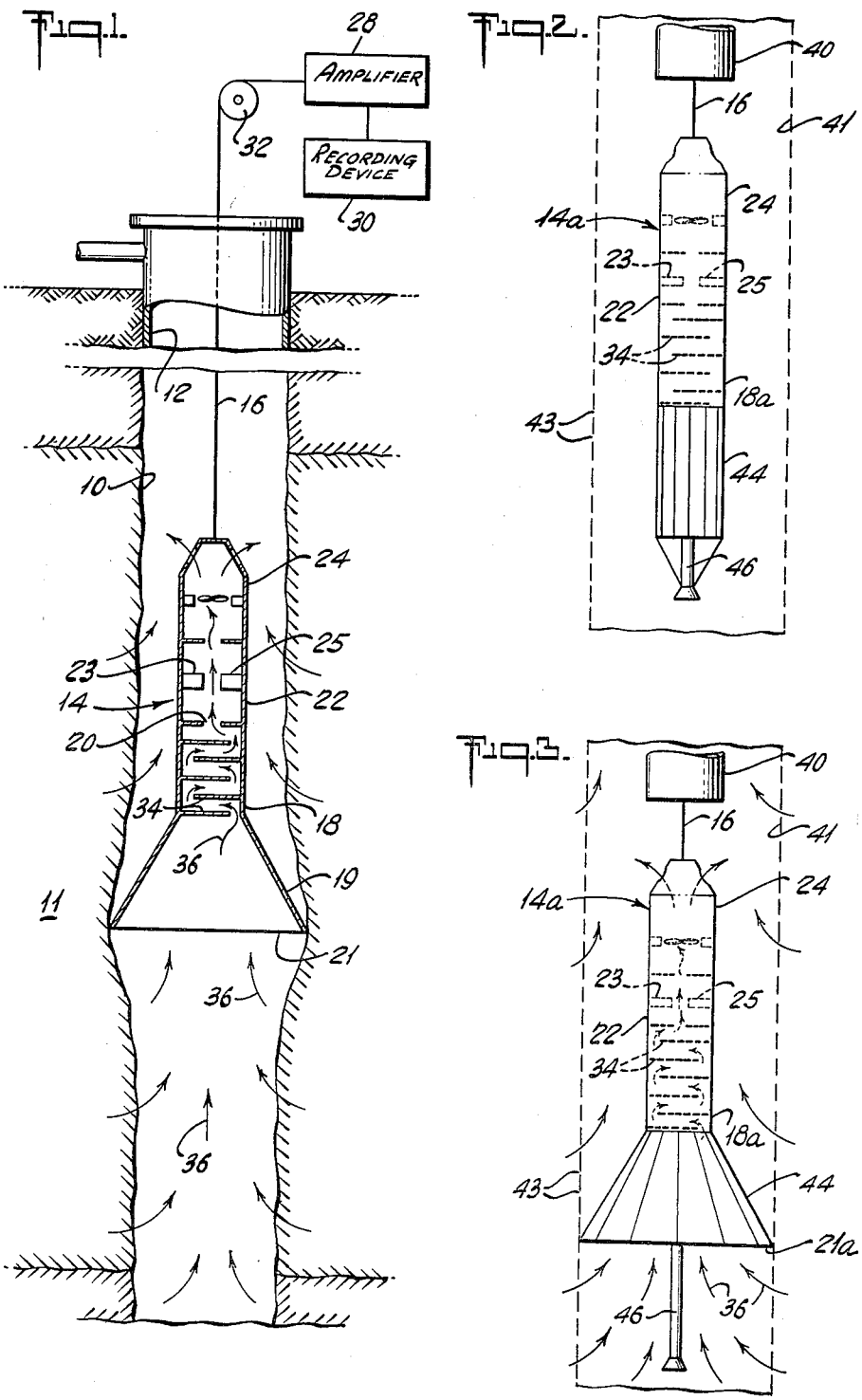

3,176,511
PRODUCTIVITY WELL LOGGING
Richard H. Widmyer, Houston, Tex., assignor to Texaco Inc., New York, N.Y., a corporation of Delaware
Filed Sept. 25, 1962, Ser. No. 227,631
1 Claim. (Cl. 73—155)

This is a continuation-in-part of application Ser. No. 768,759, filed October 21, 1958.

This invention relates to well production and more particularly to a method and an apparatus by means of which a measurement or determination can be made as to the exact location of zones or formations from which a fluid or a plurality of fluids, such as gas, oil, and water are entering a well bore. A measurement of this kind is sometimes known as a productivity log or profile of the borehole or a section thereof.

In oil well production it is, of course, desirable, if not frequently essential to know the depth and vertical thickness of a subsurface formation or zone from which a fluid such as gas, oil or water is entering the hole. In many instances two of these fluids or all three may be flowing into the well at the same time from different zones or formations and it is desirable to ascertain the location of these zones or formations. Furthermore, it is frequently necessary to know the amount of one or more of the fluids flowing into the well together with the locations of the zones from which they are flowing. After a productivity log of the well has been obtained the information contained therein may be useful to determine whether or not a gas or water producing formation may be sealed off from a formation or zone producing oil.

In accordance with this invention a method and apparatus has been provided which will determine the volume and type of fluids produced in a given formation or interval thereof in a cased or open hole.

In carrying out the invention, a logging instrument is passed through the portion of the well to be logged while suspended from a conductor cable extending upwardly from the instrument to suitable recording means preferably located at the surface. The instrument includes means for providing a sample of the total fluid production below a given point in a well at which the instrument is positioned, means for determining a characteristic or property of the sample so as to identify same, and means for determining the volume or flow rate of the total fluid production below the given point. In accordance with this invention the productivity log is obtained by systematically positioning the instrument at various well depths throughout the formation or zone of interest.

For a better understanding of the invention, reference may be had to the accompanying drawings in which:

FIG. 1 is a vertical sectional elevation through a portion of a borehole showing an instrument embodying one form of the present invention suspended therein, FIG. 2 is a diagrammatic elevation of an embodiment of the invention in which an expansible instrument is shown in its contracted condition for lowering, for example, through a tubing string, and FIG. 3 is a view of the instrument shown in FIG. 2 in its expanded condition.

Referring to the drawings and particularly to FIG. 1 thereof, a well bore 10 provided with a casing 12 at the upper portion thereof is shown traversing a producing formation 11. Suspended within the hole 10 by means of a conductor cable 16 is an instrument 14 comprising an open-bottomed, bell-shaped shell or housing or inverted funnel 18, the lower or larger portion 19 of which is adapted to engage at its base 21 the wall of the borehole 10 so as to provide a fluid-tight seal between the wall of the borehole and the housing 18 for fluids flowing upwardly in the borehole 10. The lower portion 19 of the bell-shaped housing 18 is preferably resilient so as to be capable of conforming with the varying shape and size of the cross-sectional area of the borehole 10 to retain the fluid-tight seal. Within the bell-shaped housing 18 is a plurality of parallel, separated, alternately disposed baffle plates 34 arranged in such manner that the well fluid indicated by the arrows 36 must move through a tortuous passage on its way upwardly in the housing 18. In passing through and between the baffles 34 the fluid is thoroughly mixed in a manner such that when it passes through appropriate measuring devices, the characteristic and flow rate of all of the fluid flowing from and below the location of the open end of the portion 19 of housing 18 will be measured. If the instrument 14 is to be used in a borehole of uniform diameter, such as a cased well, baffle plates may be disposed in the lower portion 19 of the bell-shaped housing. The upper end of the housing 18 is provided with one or more openings or apertures 20 through the partitions shown. These partitions are located above and below a fluid property or characteristic measuring device 22, which may be any one of a number of known measuring devices, such as a fluid resistivity measuring device or a fluid density measuring device having at least two elements 23 and 25 between which all of the mixed fluid passes. When the resistivity measuring device is used the two elements 23 and 25 may be two electrodes connected to opposite terminals of a source of electric energy in circuit with the fluid passing between the two elements 23 and 25. When a fluid density measuring device is used one of the two elements 23 and 25 may be a source of penetrative radiation and the other element may be a detector of the penetrative radiation.

Disposed above the measuring device 22 and in the stream of the upwardly flowing fluid is a flow rate or volume measuring device 24 which may be, for example, an impeller, or torsion wire device of any suitable known type actuated by fluid movement. The impeller device may include a small propeller adapted to be rotated by the borehole fluids at speeds varying with the velocity of the fluids and means for recording the revolutions of the propeller, and the torsion wire device may be of the type described in U.S. Patent No. 2,706,406. Although the flow rate measuring device 24 is shown disposed above the fluid characteristic measuring device 22, it should be understood that the position of these two devices 22 and 24 may be interchanged. The cable 16 is connected to the instrument 14 above the measuring devices 22 and 24 and extends upwardly to a suitable amplifier 28 connected in turn to a recording device 30 which may record the output from the measuring devices 22 and 24 in the form of a log on a moving tape or strip. The cable 16 passes over a suitable cable measuring device 32 which indicates or records in a well known manner the amount of cable payed out and thus the depth of the instrument 14 in the hole at any time.

In operation, the instrument 14 suspended by the cable 16 is lowered into the borehole 10 preferably to the lowest depth of the zone to be logged or zone of interest. The instrument 14 is held stationary at this point for a period of the in order to permit the fluid in the borehole 10 flowing upwardly from below this depth to become thoroughly mixed in the bell-shaped housing 18 and to enter into the measuring devices 22 and 24 which respond to a characteristic, for example, density or resistivity, and the flow rate, respectively, of the thoroughly mixed fluid. The output signals from the measuring devices 22 and 24 are transmitted preferably simultaneously to the surface of the earth via electrical conductors in cable 16 and are applied to the recording device 30 after suitable amplification in amplifier 28. After the desired information at the first depth in the borehole 10 is recorded, the instrument 14 is raised to a second point or depth in the borehole 10 where the characteristic and rate of flow of the borehole fluid is recorded in a manner similar to that at the first depth. The rate of flow of the fluid flowing into the borehole 10 from the interval between the first and second depth can be readily determined by merely substracting the flow rate recorded at the first depth from the flow rate recorded at the second depth. The type of fluid flowing into the borehole from any interval can be identified by noting the changes in the recorded characteristic of the fluid as the instrument 14 is progressively moved through the borehole and the flow rates from the various intervals. Accordingly, the type of fluid and the flow rate of the fluid flowing into the borehole from a given zone or formation are readily determined and thus the productivity log is obtained by systematically positioning the instrument 14 at various borehole depths throughout the formation or zone of interest and recording the output from the measuring devices.

Although a stepwise procedure has been described for obtaining a productivity log of a well, it should be understood that alternatively the measurements may be made in accordance with this invention as a continuous log by slowly traversing the productive interval, either in an upward or downward direction. When the continuous log is to be obtained suitable adjustments should be made to compensate for the speed of the moving instrument 14.

There are many times when it is desirable to make a productivity log of a producing zone or zones of interest in a borehole which is provided with a tubing string. In such an instance it would be preferable to use an expansible logging instrument which in its collaspsed condition could be lowered into the borehole through the tubing string. Accordingly, this invention also contemplates an instrument comprising fluid sample producing means which can be maintained in a collapsed or contracted condition while being lowered through the tubing string and subsequently expanded so as to engage the borehole wall or the interior of a perforated casing. The apparatus is also adapted to be collapsed again after the measuring operation is completed so that it can be withdrawn from the hole through the tubing string. Such an instrument is schematically illustrated in FIGS. 2 and 3 of the drawing. In FIG. 2, the instrument 14a is shown in its collapsed condition below the bottom of a tubing 40 within a well casing 41 having perforations 43. In FIG. 3, the instrument 14a is shown in its expanded condition below the tubing 40 within the casing 41 and ready for the measurement of the desired characteristic and flow rate of the well fluid.

As shown in FIGS. 2 and 3, the instrument 14a is similar to the instrument 14 shown in FIG. 1 except for the lower portion of the bell-shaped housing. The instrument 14a comprises a characteristic measuring device 22, a flow rate measuring device 24, and baffle plates 34 in the housing 18a which are similar to or identical with the measuring devices and baffle plates shown in FIG. 1. The housing 18a in addition to comprising the baffles 34 also includes a collapsible shell or skirt indicated generally at 44. The shell 44 can be formed of a plurality of interweaving metal strips or a folding, flexible skin of rubber or the like. Extending downwardly within the shell 44 is a vertical tripping member 46 which in combination with the shell 44 appears as a device which is somewhat in the nature of an umbrella. The operation of expanding and collapsing the shell 44 is well known in the art and may be performed in any suitable manner, for example, as described in my U.S. Patent No. 2,932,740, which was copending with the parent application hereof, now abandoned. Briefly, the vertical tripping member 46 is maintained in an upper position by a latching mechanism disposed within the flexible shell 44 when the shell 44 is in its collapsed condition, as shown in FIG. 2. When the lower end of the tripping member 46 strikes the bottom of the borehole the latching mechanism releases the tripping member and the shell 44 is placed in its expanded condition, as shown in FIG. 3. The instrument 14a can then be pulled upwardly to any desired location whereupon the well fluid indicated by the arrows 36 in FIG. 3 will be forced to flow upwardly through the shell 44 and through the baffle plates 34, then through the measuring devices 22 and 24 and again outwardly to the borehole. After the desired measurements for the productivity log have been made the instrument 14a will again be lowered to the bottom of the hole whereupon the vertical tripping member 46 will again be moved upwardly and again latched in its upper position, the shell 44 again being placed in its collapsed condition. The instrument 14a can then be withdrawn from the borehole through the tubing 40.

It should be understood that the embodiment of the invention illustrated in FIGS. 2 and 3 may be used not only in boreholes provided with a tubing string but also this embodiment may be advantageously used in open holes having such a varying diameter so as to prevent the lowering of the instrument 14 illustrated in FIG. 1. Furthermore, the instrument 14 shown in FIG. 1 may also be used in wells containing a tubing string but the instrument 14 should be lowered into the well below the tubing string before the tubing string is placed in the well.

Accordingly, it can be readily seen that an apparatus has been provided for obtaining an accurate productivity log wherein well fluid is thoroughly mixed and so that measurements of the fluid in the characteristic measuring device will be truly representative of the total fluid production below any point in the well at which the device is positioned.

While certain embodiments of the invention have been described in considerable detail, in accordance with the applicable statutes, this is not to be taken as in any way limiting the invention but merely as being descriptive thereof.

I claim:

Apparatus for determining the nature, location, and flow rate of fluids flowing from a given portion of a borehole comprising in combination with an open-bottomed housing, and means for passing said housing through the borehole while suspended from a conductor cable, said housing including means engaging the walls of the borehole so that substantially all of the fluid entering the borehole below the housing will be forced to pass upwardly through the housing, said housing also having first aperture means adjacent the upper end thereof for conducting all of the fluid out of said housing, and baffle means within said housing comprising a plurality of alternately disposed and separated baffle plates forming the walls of a tortuous passageway in which the fluid is confined in its upward flow for mixing all the fluid passing therethrough, the improvement comprising a first partition located within said housing above said baffle means and having second aperture means therethrough for the passage of all of said fluid, a second partition within said housing spaced vertically above said first partition and spaced vertically below said first aperture means and having third aperture means therethrough for the passage of all of said fluid, said first and second partitions defining with the walls of said housing two adjoining chambers through which all of said fluid flows on the way to said first aperture means, means within one of said chambers for measuring a characteristic of said fluid, and means in the other of said chambers for measuring the flow rate of said fluid.

References Cited in the file of this patent

UNITED STATES PATENTS 2,932,740    Widmyer _____ Apr. 12, 1960
2,965,753    Reynolds et al. _____ Dec. 20, 1960